Patented June 22, 1948

2,443,878

UNITED STATES PATENT OFFICE 2,443,878

METHOD OF MANUFACTURING SELENIUM CELLS

Johannes Jacobus Asuerus Ploos van Amstel, Eindhoven, Netherlands, assignor to Hartford National Bank & Trust Co., Hartford, Conn., as trustee No Drawing. Application September 21, 1945, Serial No. 617,918. In the Netherlands February 22, 1943

Section 1, Public Law 690, August 8, 1946, Patent expires February 22, 1963

5 Claims. (Cl. 175—366)

Selenium cells are frequently constituted by a metal carrier plate having applied to it a layer of conductive crystalline selenium, which constitutes a semi-conductive electrode and is covered wth a conductive electrode in the form of a metal layer, which may be applied, for example, by spraying. In this case it is assumed that a blocking layer is located between the two electrodes.

It has been found that the adherence of the conductive electrode to the substratum frequently leaves much to be desired. The consequences thereof are most manifest in small cells, especially rectifying cells, in which a supply conductor is soldered to the conductive electrode. In the case of unsatisfactory adherence to the supply conductor the whole counter-electrode may then detach from the substratum. But also in comparatively large cells unsatisfactory adherence is disadvantageous both in mechanical and electrical respect. In electrical respect it is disadvantageous, since unsatisfactory adherence may result in the deterioration of the blocking layer and a decay of the electrical properties of the cell, amongst others a decrease of the forward current.

The present invention relates to a method of manufacturing selenium cells, a carrier plate having applied to it a selenium layer which, after being converted into the conductive crystalline state, is covered with a conductive metal layer, resulting in very good adherence of the metal layer to the substratum.

According to the invention the carrier plate, together with the layer of crystalline selenium, is subjected to a heating in vacuum.

It is known per se prior to the application of the conductive electrode to expose selenium plates to a prolonged heating in the air. It has been found, however, that this method of heating does not yield any improvement in adherence.

With the method according to the invention advantageous results are obtained with a heating between 120° and 180° C. in a vacuum of 1 mm. mercury, or less, during about 1 hour.

The temperature and/or the period of time may generally be chosen lower and shorter respectively, according as the pressure decreases. Very good results are obtained with a heating to 160° C. under a pressure of 0.1 mm. mercury during 1 hour.

The method is preferably carried out with those selenium cells which, after the selenium layer has been applied, are subjected to a treatment producing a blocking layer by means of spraying with an alkaline liquid, such as chinoline.

In order that the invention may be more clearly understood and readily carried into effect, one embodiment thereof will now be set out more fully by way of example.

A carrier plate, which may consist of zinc-plated aluminium covered with a carbon layer, has poured on it a selenium layer and is converted into the crystalline state in a heated press. Said plate has applied to it by atomisation an alkaline liquid, for example chinoline. Now, the plate is placed in a vacuum of about 0.1 mm. mercury and heated to a temperature of 150° C. during 1 hour. After this heating, the plate is covered in the usual manner with a layer of an alloy constituted by tin, bismuth and cadmium, which has a melting point of 103° C.

The adherence of this metal layer has been found considerably better than with cells which have not been treated in the above-described manner. Further, it has been found that the electrical properties of these cells have also become much more constant.

What I claim is:

1. The method of manufacturing selenium cells in which the adhesion between the selenium layer electrode and the conductive electrode is substantially increased comprising the steps of forming a layer of selenium on a base, converting the selenium layer into a crystal modification thereof, heating the crystalline selenium layer formed on said base to a temperature greater than 120° C. in vacuo, and forming a conductive electrode on said selenium layer.

2. The method of manufacturing selenium cells in which the adhesion between the selenium layer electrode and the conductive electrode is substantially increased comprising the steps of forming a layer of selenium on a base, converting the selenium layer into a crystalline modification thereof, forming a unidirectional current conducting layer on said selenium layer, heating the crystalline selenium layer formed on said base to a temperature between approximately 120° C. and 180° C. in vacuo, and forming a conductive electrode on said selenium layer.

3. The method of manufacturing selenium cells in which the adhesion between the selenium layer electrode and the conductive electrode is substantially increased comprising the steps of forming a layer of selenium on a base, converting the selenium layer into a crystalline modification thereof, forming a unidirectional current conducting layer on said selenium layer, heating the crystalline selenium layer formed on said base in a vacuum of less than one millimeter of mercury to a temperature between approximately 120° C. and 180° C. for approximately one hour, and forming a conductive electrode on said selenium layer.

4. The method of manufacturing selenium cells in which the adhesion between the selenium layer electrode and the conductive electrode is substantially increased comprising the steps of forming a layer of selenium on a base, converting the selenium layer into a crystalline modification thereof, forming a unidirectional current conducting layer on said selenium layer, heating the crystalline selenium layer formed on said base in a vacuum of less than 0.1 millimeter of mercury to a temperature of approximately 150° C. for approximately one hour, and forming a conductive electrode on said selenium layer.

5. The method of manufacturing selenium cells in which the adhesion between the selenium layer electrode and the conductive electrode is substantially increased comprising the steps of forming a layer of selenium on a base, converting the selenium layer into a crystalline modification thereof, treating the crystalline selenium layer with an alkaline liquid to form a unidirectional current-conducting layer thereon, heating the crystalline layer formed on said base in a vacuum of less than 0.1 millimeter for mercury to a temperature of approximately 150° C. for approximately one hour, and forming a conductive electrode on said selenium layer.

JOHANNES JACOBUS ASUERUS
PLOOS VAN AMSTEL.

REFERENCES CITED

The following references are of record in the file of this patent:

UNITED STATES PATENTS

| Number | Name | Date |
|---|---|---|
| 2,121,603 | Lotz | June 21, 1938 |
| 2,282,523 | Kreutzer | May 12, 1942 |
| 2,339,613 | Becker | Jan. 18, 1944 |